July 5, 1938.                S. B. TERRY                2,122,664
                           PRECISION GAUGE
                        Filed Jan. 2, 1935          2 Sheets-Sheet 1
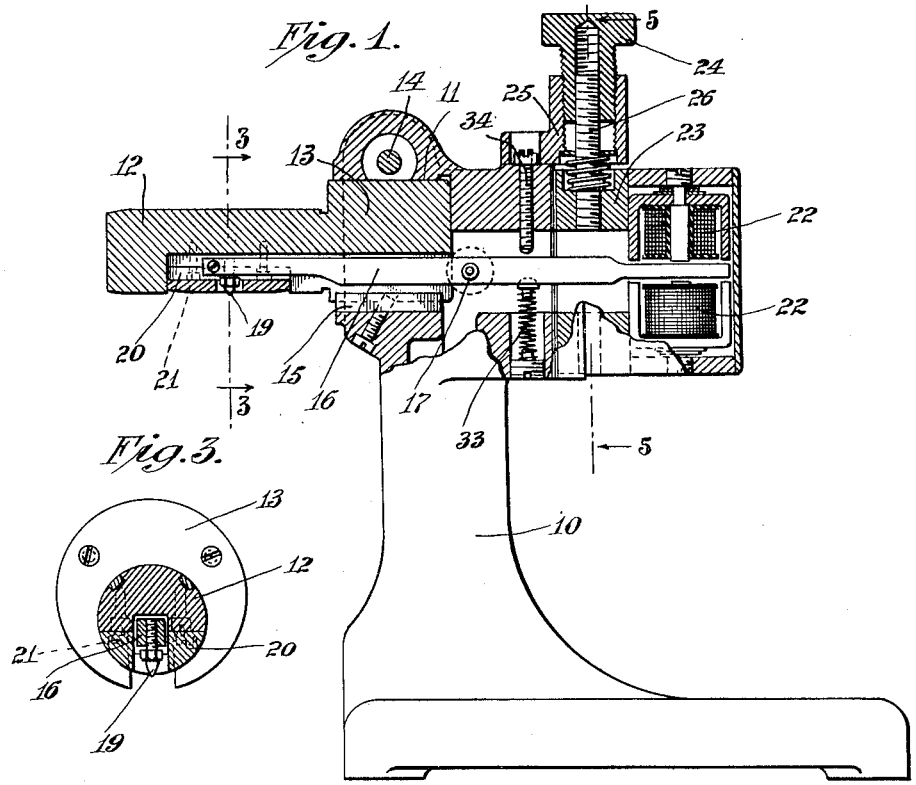
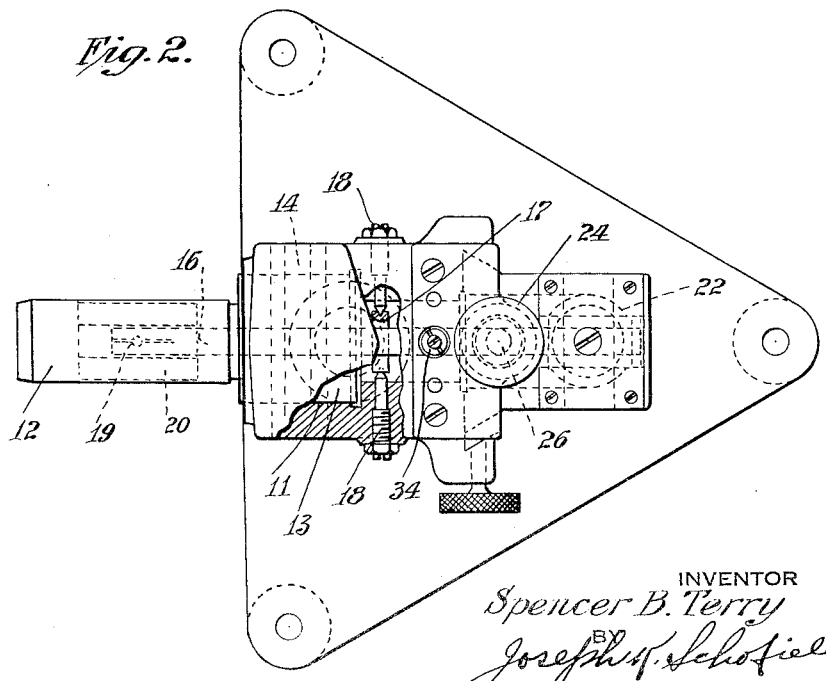
INVENTOR
Spencer B. Terry
BY
Joseph K. Schofield
ATTORNEY July 5, 1938.   S. B. TERRY   2,122,664
PRECISION GAUGE
Filed Jan. 2, 1935   2 Sheets-Sheet 2
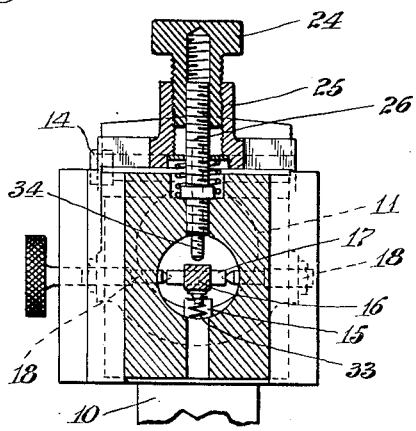
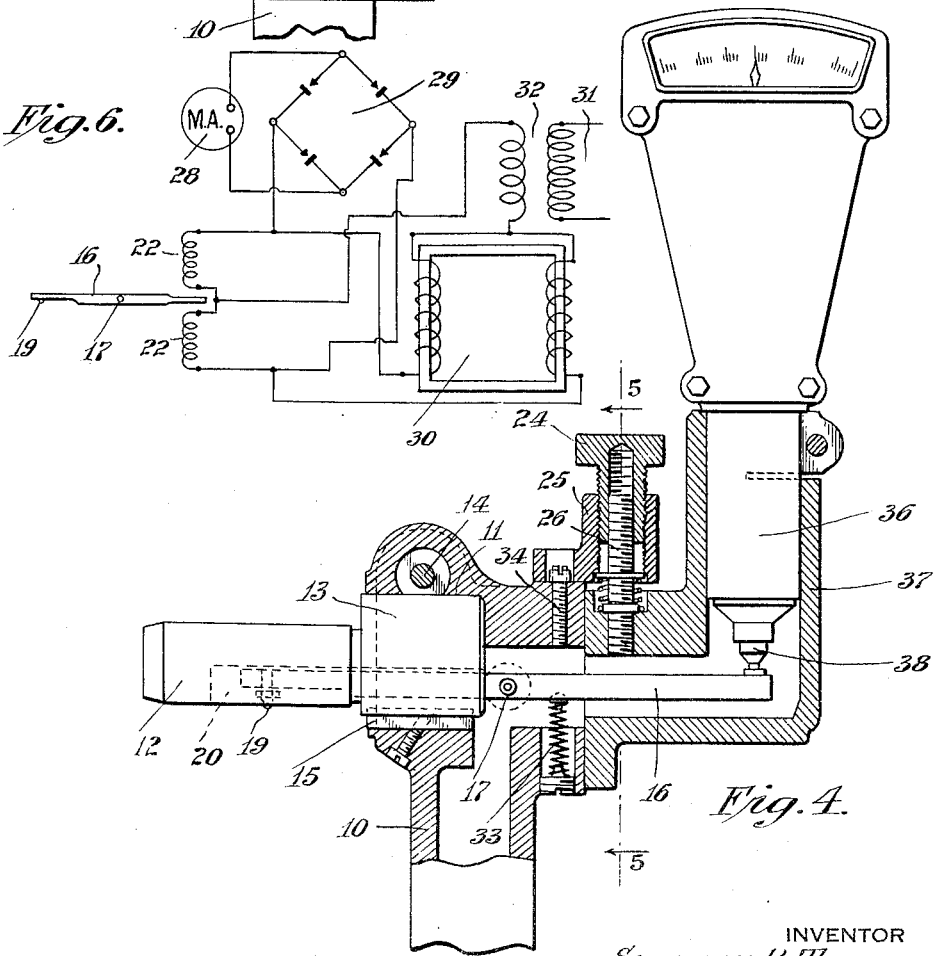
INVENTOR
Spencer B. Terry
BY
Joseph K. Schofield
ATTORNEY Patented July 5, 1938

2,122,664

UNITED STATES PATENT OFFICE 2,122,664

PRECISION GAUGE

Spencer B. Terry, West Hartford, Conn., assignor, by mesne assignments, to Niles-Bement-Pond Company, New York, N. Y., a corporation of New Jersey Application January 2, 1935, Serial No. 3

6 Claims. (Cl. 33—178)

This invention relates to precision dimension gauges and particularly to an electrically operated gauge adapted primarily for internal measurements.

A primary object of the present invention is to provide a convenient and extremely sensitive distance measuring gauge which may be readily adjusted for gauging widely different diameters of internal cylindrical surfaces.

One feature which enables me to accomplish the above named object is that the member providing the engaging surface for the work piece being gauged is removably secured within the body member of the gauge in a manner adapted for ready substitution of similar members for other dimensions and in a manner to permit the other principal parts of the gauge to be used without disassembly or readjustment.

Another object of the invention is to provide a cylindrical clamping surface for the member engaging the part being gauged parallel to but eccentric relative to the surface engaging the part being gauged so that the same movable contactor may be used with any gauging member inserted within the gauge for widely different diameters.

And finally it is an object of the invention to provide a movable contacting member or lever for the part being gauged having a contactor such as a diamond located at its free end, the lever being pivotally mounted on the gauge, this lever preferably being housed within and extending generally parallelly with the gauging member, there being precision indicating means for the position of the movable contacting member associated with its opposite end.

With the above and other objects in view, my invention includes the features of construction and operation set forth in the following specification and illustrated in the accompanying drawings.

In the accompanying drawings annexed hereto and forming a part of this specification, I have shown my invention embodied in two different types of distance determining gauges both of which are adapted specifically for internal work and one being electrically operated, but it will be understood that the invention can be otherwise embodied and that the drawings are not to be construed as defining or limiting the scope of the invention, the claims appended to this specification being relied upon for that purpose.

In the drawings:

Figure 1 is a side elevation partly in section of a complete gauge showing one embodiment of the invention.

Fig. 2 is a plan view of the gauge shown in Fig. 1, parts being broken away to show the pivotal mounting for the lever mounting the movable contacting member.

Fig. 3 is a cross sectional view taken upon the line 3—3 of Fig. 1.

Fig. 4 is a side elevation, partly in section, showing a modified form of gauge provided with the present invention.

Fig. 5 is a sectional view taken upon the line 5—5 of Fig. 1 or 4 and showing the pivotal mounting for the lever and the adjusting means for the indicating means, and Fig. 6 is a wiring diagram showing the electric circuits for the indicating means of the gauge shown in Figs. 1, 2 and 3.

In the above mentioned drawings I have shown two embodiments of the invention which are now deemed preferable, but it is to be understood that changes and modifications may be made within the scope of the appended claims without departing from the spirit of the invention.

Briefly and in its preferred aspect, my invention may include the following principal parts: First, a body member or support; second, a gauging member detachably secured to the support and having an extended cylindrical portion fitting the work piece being gauged; third, a contacting member movably mounted within the support and extending substantially parallelly to the gauging member; fourth, a contactor for the part being gauged at the free end of this movable contacting member preferably in the form of a diamond, this contactor extending slightly beyond the periphery of the gauging member and being substantially in alinement with a portion of the surface of the clamping portion of the gauging member; and fifth, indicating means cooperating with the contacting member on the end opposite to that on which the contactor is mounted to indicate the position thereof when in gauging position.

Referring more in detail to the figures of the drawings and first to the embodiment shown in Figs. 1 and 2, I provide a support or body member 10 adapted to rest upon a bench or other convenient supporting surface. A cylindrical recess 11 formed in one side of the support provides a bearing surface for a gauging member 12 having a cylindrical portion 13 closely fitting this recess. Clamping means such as a binding screw or bolt 14 is provided for quickly clamping or unclamping the gauging member 12 within the recess 11 so that different gauging members may be substituted one for the other depending on the particular size desired to be gauged. The extended portion of this gauging member 12 over which the part being gauged is placed is cylindrical and is eccentric to the cylindrical clamping portion 13 thereof. The lower portion of the extended portion 12 is substantially parallel to an element of the clamping portion 13. It will be understood that this eccentricity will vary for each size being gauged and that each gauging member 12 will be individually made for its particular size. The clamping portion 13 of each gauging member 12 would, of course, be identical; the portion over which the part being gauged fits, however, would be widely different. In each case, however, one side of the gauging portion 12 would be substantially in alinement with one side of the clamping portion.

Inserted within the support 10 and extending within the recess 11 is a key 15 which may engage a key way formed in the gauging member 12 so that each gauging member will be prevented from rotating and will always be positioned within its support in proper position.

Pivotally mounted within the support 10 is a lever 16, one end of which extends to an intermediate portion of the gauging portion of the gauging member 12 and the opposite end is extended a material distance for purposes presently to be described. In order that the lever 16 may be mounted with minimum friction, a short transverse shaft 17 is pressed into this lever 16 having conical depressions at its ends, these depressions fitting the conical ends of inwardly extending screws 18 which permit mounting the lever 16 with minimum friction upon a horizontal axis. The axis of this lever is adjacent the lower portions of the clamping portion and engaging portions of the member 12. The lever 16 is therefore always substantially the same distance from the lower portion of the gauging member 12 regardless of the diameter of the part being gauged.

One end of the lever 16 is provided with a contactor 19 such as a diamond partly enclosed within the end of a small screw threaded into the free end of the lever. This contactor 19 is positioned substantially midway of the gauging portion of the gauging member 12 and extends to and slightly beyond the periphery of the gauging surface. This mounting and position of the contactor 19 will be apparent by inspection of Figs. 1 and 3. Preferably the gauging member 12 is provided with a channel or longitudinal recess 20 extending substantially throughout its length through which the lever 16 extends. By this means the lever 16 is substantially enclosed and by removing the contactor 19 permits the gauging member 12 to be readily removed after the clamping bolt 14 has been loosened. The gauging portion of member 12 preferably is flatted on its lower side and a shoe or plate 21 apertured for the contactor 19 is secured thereon so that the surface engaged by the part being gauged is substantially a complete cylindrical surface slightly less than the minimum diameter for which the gauge is adjusted.

Mounted upon the opposite side of the support 10 is an indicator operating device, this in Fig. 1 being in the form of opposed adjustable coils 22 similar to those shown and described in patent to Mershon et al. 1,928,457. The lever 16 extends directly between their adjacent surfaces and its position relative to the two opposed coils differs for different gauging positions. This lever 16 and parts adjacent the coils are of steel or other magnetic material. Its position between the coils 22 during gauging operation varies the intensity of induced currents through the windings of these coils, this variation being indicated by an appropriate electrical instrument such as a milliammeter 28.

For convenience in final adjustment of the gauge for any particular dimension being gauged, the coils 22 are mounted in a slidable member 23 movable vertically along appropriate ways formed in the support 10. In order to obtain close adjustments of these coils 22 by movement up or down of member 23, a differential screw mechanism is provided so that by rotation of the nut 24 within threads formed in a fixed bracket 25 on the support 10 and upon the threads of a screw 26 outstanding from and movable with the block 23 carrying the coils 22, the coils may be very slowly adjusted up or down. Normally the lever 16 is forced by a spring 33 so that the contactor is in the position for the maximum diameter for which the gauge is set. A screw 34 may be adjusted to a position limiting movement of the lever 16 in the opposite direction.

In Fig. 6 are shown the electric circuits employed in the gauge employing the coils 22 and the micro-ammeter or other form of electric indicating instrument 28. In this circuit the indicating instrument is shown diagrammatically at 28. The rectifier is indicated at 29 and the transformer coupled to the coils 22 is shown at 30. The circuit usually available is 60 cycle, 110 volt, so that between the source of current 31 and the gauging circuits there may be interposed a transformer 32 for reducing the voltage within the circuit for the coils 22. These circuits are or may be similar in every way to those described in the above mentioned patent to Mershon. For that reason further description is not thought to be necessary.

Referring to the modification of the invention shown in Fig. 4, it will be seen that the gauging member 12 having a cylindrical clamping portion and cylindrical gauging portion eccentric to each other in every way similar to the corresponding parts shown in Fig. 1. Also the contacting lever 16 and its mounting are the same. Instead, however, of having adjustably mounted coils as shown in Fig. 1, a mechanical or multiplying linkage type indicator 36 is mounted upon a bracket 37 so that its movable member or spindle 38 is in contact with the extended portion of the lever 16. By adjustment up or down of the bracket 37 supporting the indicator 36 by means of the nut corresponding to nut 24 and the differential screw mechanism associated therewith, the position of the indicator 36 may be very closely adjusted for any gauging diameter. Different gauging members 12 for different diameters would be used for this type of gauge and would be employed in the same manner as in the gauge shown in Fig. 1.

What I claim is:
1. A gauge comprising in combination, a support, a member extending from one side thereof adapted to engage the work piece being gauged, said member being detachably secured to said support, a lever pivotally mounted within said support and having a work piece contactor at its free end, clamping means for securing and releasing a detachable member to said support while said lever remains in its mounted position, indicating means associated with the opposite end of said lever and mounted on said support on the oppo- site side to the detachable member, and means to adjust said indicating means relative to said lever.

2. A gauge comprising in combination, a support, a member extending from one side thereof adapted to engage the work piece being gauged, said member being detachably secured to said support, a work piece contactor carrying lever pivotally mounted within said support and extending substantially parallelly with said work piece engaging member adjacent a portion of the surface thereof, clamping means for securing and releasing a detachable member to said support while said work piece engaging member remains in its mounted position, indicating means associated with one end of said lever and mounted on said support on the opposite side to the work piece engaging member, and means to adjust said indicating means in a direction normal to said lever.

3. A gauge comprising in combination, a support, a member detachably secured thereto adapted to engage the work piece being gauged, a contacting member for the work piece pivotally mounted within said support and extending adjacent a portion of the surface of said detachable member, means to indicate the position of said contacting member when in gauging contact with the work piece being gauged, and retaining means for said detachable member enabling said member to be mounted and dismounted while said contacting member is in operative position.

4. A gauge comprising in combination, a support, a member detachably secured thereto upon one side thereof adapted to engage the work piece being gauged, a contacting member for the work piece pivotally mounted within said support and extending adjacent a portion of the surface of said detachable member, clamping means to retain said detachable member in position on said support, and means mounted on the support opposite the engaging member to indicate the position of said contact member when in gauging contact with the part being gauged, whereby engaging members may be substituted for different sizes of work pieces with the contacting member and indicating means in their mounted positions.

5. A gauge comprising in combination, a support, a member detachably secured thereto and extending normally therefrom, an extended portion of said member forming the engaging portion for the work piece being gauged, said work engaging portion being cylindrical and disposed eccentrically to said securing portion, clamping means to retain said detachable member in position on said support, and a movable contacting member for the work piece extending adjacent a portion of the surface of said first named member, said contacting member being pivotally mounted on said support and extending within a recess formed within said detachable member, clamping means for said detachable member to secure or release a detachable member while said contacting member is is mounted position, and means to indicate the position of said contacting member when in gauging contact with the work piece being gauged.

6. A gauge comprising in combination, a support, a member detachably secured thereto and extending normally therefrom, an extended portion of said member forming the engaging portion for the work piece being gauged, said portion being cylindrical and disposed eccentrically to said securing portion, and a movable contacting member for the work piece pivotally mounted within the support and extending adjacent the surface of and parallel to said first named member, and means adjustably mounted on said support to indicate the position of said contacting member when in gauging contact with the part being gauged.

SPENCER B. TERRY.